(12) United States Patent
Aldigeri

(10) Patent No.: US 8,506,279 B2
(45) Date of Patent: Aug. 13, 2013

(54) SAFETY DEVICE FOR PUNCHES IN A COMPRESSION MOULDING APPARATUS

(75) Inventor: Gianluca Aldigeri, Bagnacavallo (IT)

(73) Assignee: Sacmi Cooperativa Meccanici Imola Societa' Cooperativa (IT)

( * ) Notice: Subject to any disclaimer, the term of this patent is extended or adjusted under 35 U.S.C. 154(b) by 6 days.

(21) Appl. No.: 13/320,051

(22) PCT Filed: May 11, 2010

(86) PCT No.: PCT/IB2010/052091
§ 371 (c)(1),
(2), (4) Date: Feb. 6, 2012

(87) PCT Pub. No.: WO2010/131205
PCT Pub. Date: Nov. 18, 2010

(65) Prior Publication Data
US 2012/0121747 A1    May 17, 2012

(30) Foreign Application Priority Data
May 12, 2009    (IT) .............................. MO2009A0124

(51) Int. Cl.
*B29C 43/08*    (2006.01)
*B29C 43/50*    (2006.01)
*B29C 43/58*    (2006.01)

(52) U.S. Cl.
USPC ........... 425/135; 425/138; 425/139; 425/151; 425/348 R; 425/422; 425/438; 425/809; 425/DIG. 5

(58) Field of Classification Search
USPC ................ 425/135, 138, 139, 151, 153, 345, 425/348 R, 422, 438, 350, 809, DIG. 5
See application file for complete search history.

(56) References Cited

U.S. PATENT DOCUMENTS

| | | | |
|---|---|---|---|
| 4,776,782 A | 10/1988 | Murayama et al. | |
| 6,074,583 A | 6/2000 | Ingram | |
| 6,602,065 B1 | 8/2003 | Ingram | |
| 6,733,269 B2 * | 5/2004 | Niese | 425/350 |
| 7,638,082 B2 * | 12/2009 | Mattice et al. | 264/297.6 |
| 2003/0190385 A1 | 10/2003 | Niese | |

FOREIGN PATENT DOCUMENTS

| | | |
|---|---|---|
| GB | 674189 | 6/1952 |
| WO | 02083388 A2 | 10/2002 |

* cited by examiner

*Primary Examiner* — Richard Crispino
*Assistant Examiner* — Thukhanh Nguyen
(74) *Attorney, Agent, or Firm* — Laubscher & Laubscher, P.C.

(57) ABSTRACT

A safety device for an apparatus for compression-moulding objects that includes a moulding carousel provided with a plurality of punches and with a plurality of corresponding moulding elements, each mould element being movable between a first position in which it does not interact with the respective punch and a second position in which it interacts with the respective punch to mould an object. Each punch is associated with an extracting device suitable for extracting from the respective punch a moulded object. The extracting device is driven by a cam track obtained in a fixed frame of the moulding carousel. The cam track includes a cam track portion that is movable between an operating position in which it interacts with the extracting device and a non-operating position in which it does not interact with the extracting device.

10 Claims, 4 Drawing Sheets

SAFETY DEVICE FOR PUNCHES IN A COMPRESSION MOULDING APPARATUS

This application is a §371 national phase of PCT International Application No. PCT/IB2010/052091 filed May 11, 2010. PCT/IB2010/052091 claims priority to IT Application No. MO2009A000124 filed May 12, 2009. The entire contents of these applications are incorporated herein by reference.

The present invention relates to a safety device for punches of an apparatus for forming objects, for example compression-moulded caps.

An apparatus for compression-moulding objects comprises in general a moulding carousel provided with a plurality of mould elements, each of which is provided with a cavity intended for receiving a dose of plastics for forming an object. Each mould element is associated with a punch, which, by interacting with the respective mould element, causes compression-moulding of the object.

During the object-moulding step, the mould element is moved vertically upwards until the punch penetrates the cavity of the mould element into which a dose of plastics has been deposited and compresses said dose inside said cavity, determining the forming of the object.

After the forming step has been completed, the mould element is made to fall, returning the mould element to the initial position thereof and the formed object remains adhering to the punch.

In order to extract the object from the punch there is provided an extracting device that pushes the object downwards, freeing the object from the punch.

The extracting device may consist of an annular element that, by sliding along the punch, comes into contact with an edge of the object and pushes the object downwards until it causes the object to become detached from the punch.

A problem that may arise in apparatuses of this type is the failure of a mould element to open, where failure to open is defined as the fact that the mould element, after forming the object, does not lower to return to the initial position thereof, but remains coupled with the punch. This failure to open means that, by driving the mechanism extracting the object from the punch, the extracting ring would force itself against the mould element, with possible damage to the mould element or to the extracting mechanism.

The present invention aims to provide a safety device that prevents driving of the extracting mechanism in the event of failure of the mould element to open.

The extracting mechanism is driven by a fixed cam, which, during rotation of the moulding carousel, causes the extracting mechanism to operate.

Owing to the invention, in the event of failure of a mould element to open activation of the extracting mechanism of the punch associated with the mould element is inhibited, thus preventing the possibility that damage may occur to the mould element or to the extracting mechanism.

An embodiment of the invention is disclosed purely by way of non-limiting example with reference to the attached drawings in which.

Figure 1:
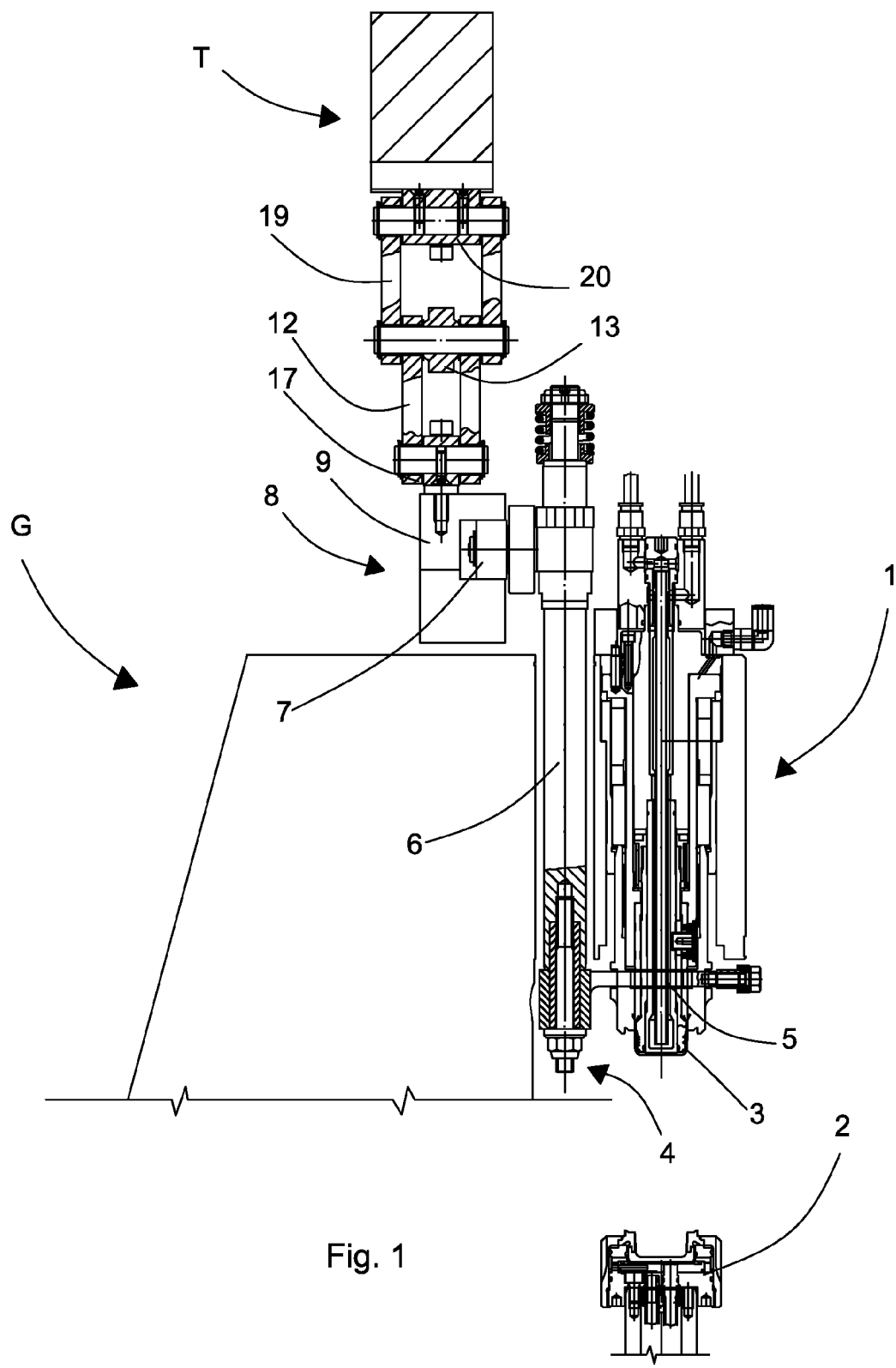
FIG. 1 is a raised view of a punch with the safety device according to the invention, in a non-operating position.

In FIG. 1 there is illustrated a punch 1 of a moulding carousel G of caps, with the corresponding mould element 2, in an opening position, after moulding of an object 3, for example a cap, before the extracting mechanism 4 extracts the object 3 from the punch 1.

The moulding carousel G comprises a plurality of punches 1 and of mould elements 2 arranged at a constant angular pitch along the periphery of the carousel. The punches 1 are arranged in a fixed position, whilst the mould elements 2 are vertically movable between a first lower position, shown in FIG. 1, in which the mould element 2 is spaced away from the punch 1 and a second upper position, shown in FIG. 2, in which the mould element 2 interacts with the punch 1 to mould an object 3.

After moulding of the object 3, the mould element 2 descends again into the first lower position, separating from the punch 1, whilst the formed object 3 remains adhering to the punch 1.

In order to extract the object 3 from the punch 1 there is provided an extracting device 4, comprising, for example, an extracting ring 5, that can run along the punch 1 until it interacts with the object 3, pushing the object downwards, so as to extract the object from the punch 1.

The extracting device 4 further includes a rod 6 to which the extracting ring 5 is fixed and is provided at its upper end with a revolving element 7 protruding laterally from the rod 6. The revolving element 7 engages a cam track 8 obtained in a fixed frame T of the moulding carousel G and, during rotation of the moulding carousel G, rolls along the profile of the cam track 8. The cam track 8 can be shaped as a circumferential groove obtained in said fixed frame T of the moulding carousel G. The cam track 8 is shaped so as to determine a downwards movement of the extracting ring 5, when a formed object 3 has to be extracted from the punch 1, and to make the extracting ring return to a non-operating position after the object 3 has been extracted from the punch 1.

Figure 2:
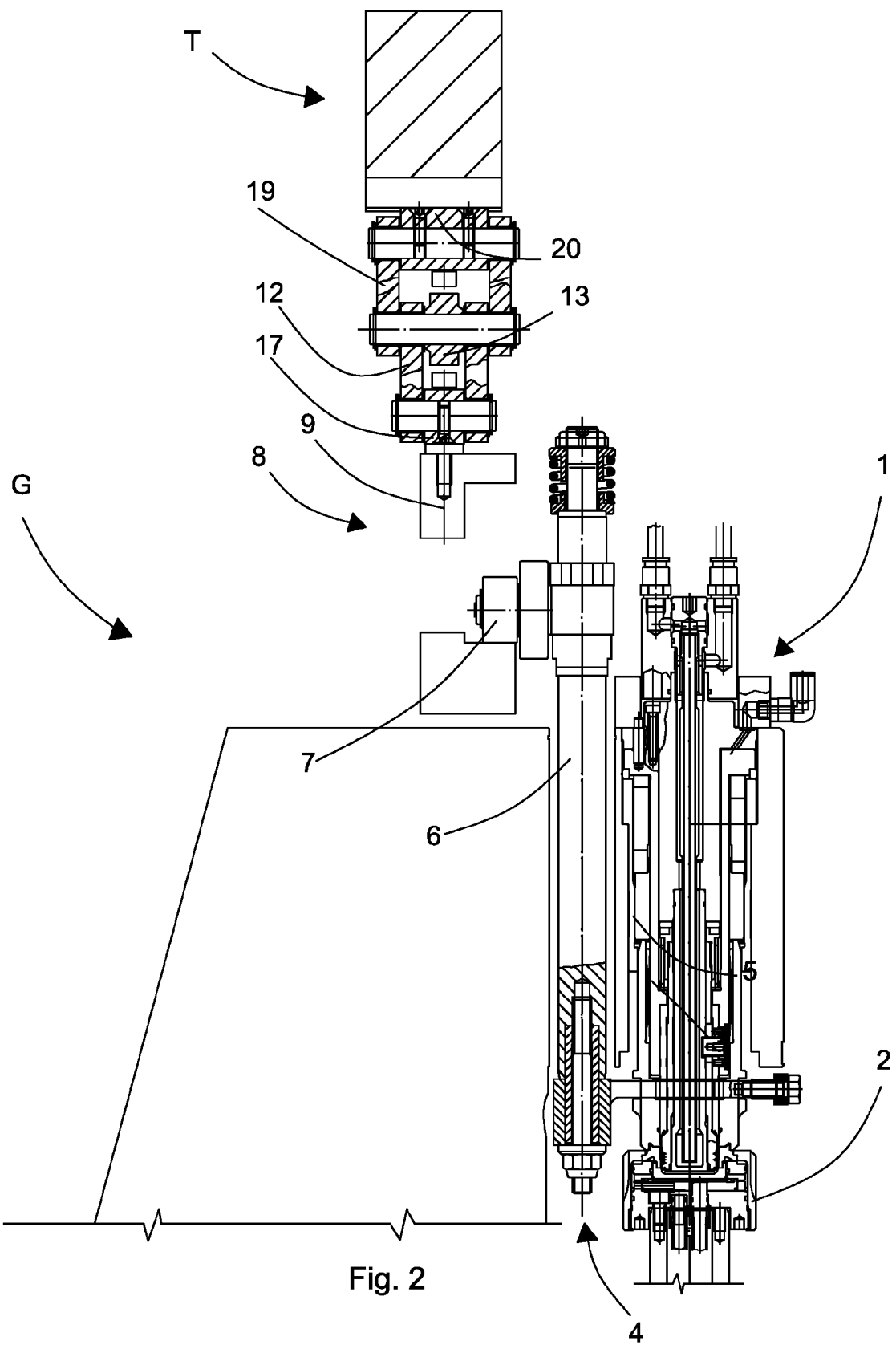
FIG. 2 is a view like the one in FIG. 1, with the safety device in an operating position.

In FIG. 2 there is shown an unusual situation that may occur when, after moulding of the cap 3, the mould element 2, instead of moving down to the lower position, remains coupled with the punch 1. In this case, if the extracting device 4 is driven, the extracting ring 5, which is used for extracting the cap 3 from the punch 1, would knock against the mould element 2, exercising a thrust thereupon, with the consequence of possible damage to the mould element 2 or to the extracting device 4, or to both.

The safety device according to the invention comprises a portion 9 of the cam track 8 that is movable between an operating position, in which the cam track portion 9 interacts with the revolving element 7 to guide the extracting ring 5 downwards in order to expel the object 3 formed by the punch 1, and a non-operating position in which the cam track portion 9 does not interact with the revolving element 7 so that the extracting ring 5 remains in a non-operating position without interacting with the object 3.

Movement of the cam track portion 9 between said operating position and said non-operating position occurs when the failure to open of the mould element 2 is detected, i.e. when the mould element 2, after moulding of the object 3, does not return to the initial position thereof but remains engaged in the punch 1. The failure to open of the mould element 2 is detected by a suitable sensor, which controls driving of the safety device by moving the cam track portion 9 to the non-operating position thereof.

A first end 10 of the cam track portion 9 is hinged on the fixed frame T of the moulding carousel G whilst to the second end 11 of the cam track portion 9 is connected via a connecting rod 12 to the stem 13 of an operating cylinder 14 the body 15 of which is hinged on a first connecting element 16 fixed to the fixed frame T of the moulding carousel G. The second end 11 of the cam track portion 9 is provided with a second connecting element 17 on which a first end of the connecting rod 12 is hinged, the second end of which is hinged on an end 18 of the stem 13. The stem of the operating cylinder 14 is further connected, by a further connecting rod 19 to a third connecting element 20 fixed to the fixed frame T of the moulding carousel G.

Figure 4:
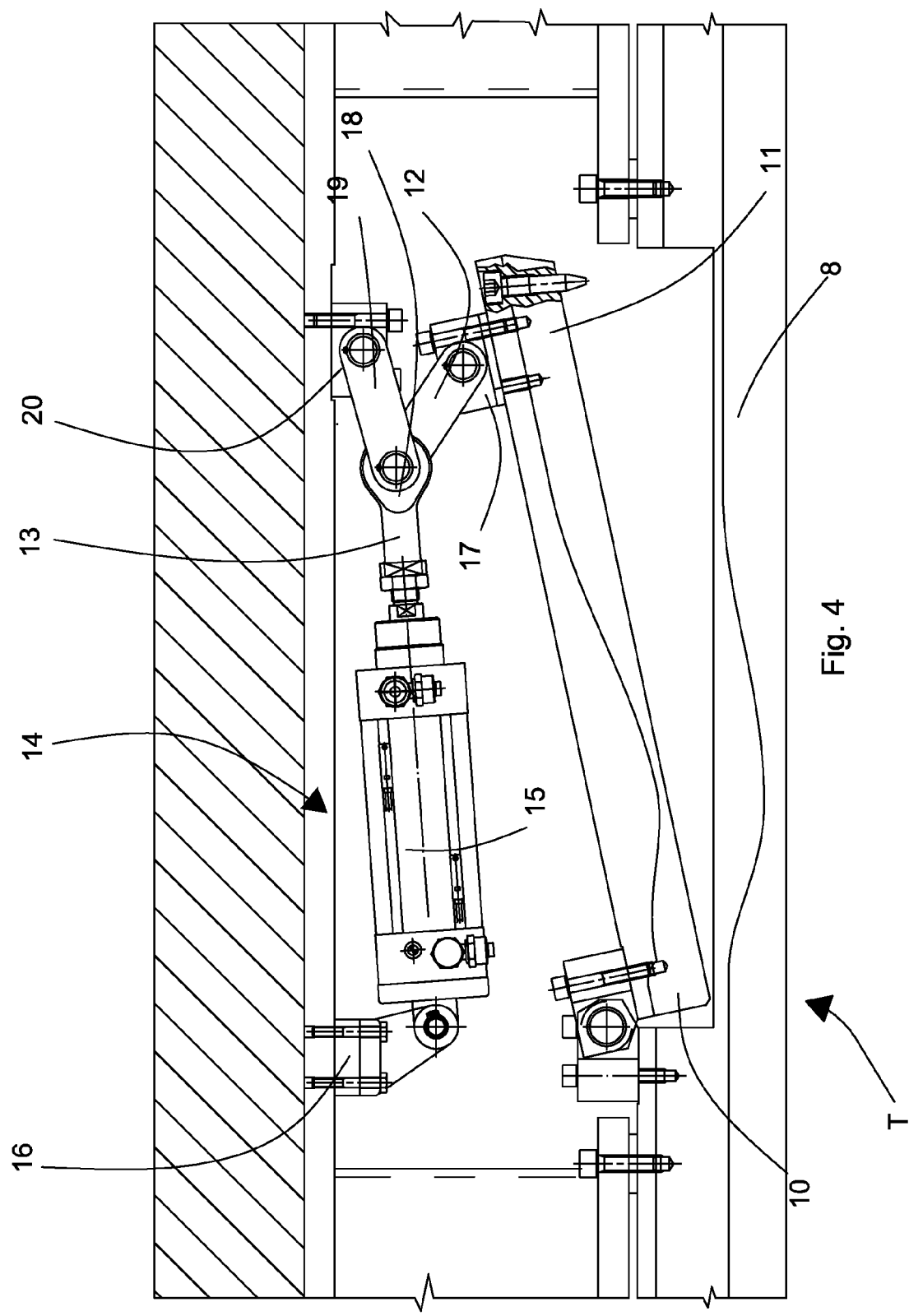
FIG. 4 illustrates the safety device according to the invention, in an operating position.

By driving the operating cylinder 14 the stem 13 lifts the second end 11 of the cam track portion 9, rotating the cam track portion 9 around the end 10 thereof hinged on the fixed frame T of the moulding carousel G. Consequently, the cam track portion 9 is lifted and moves to a non-operating position (FIG. 4) in which it does not interact with the revolving element 7. Thus when the revolving element 7 reaches the zone of the cam track portion 9, there is no longer any interaction between the revolving element 7 and the cam track portion 9, so that the extracting ring 5 is not pushed downwards and cannot interfere with the mould element 2, which remained associated with the punch 1, with the risk of damage to the extracting ring 5 and/or to the mould element 2.

Figure 3:
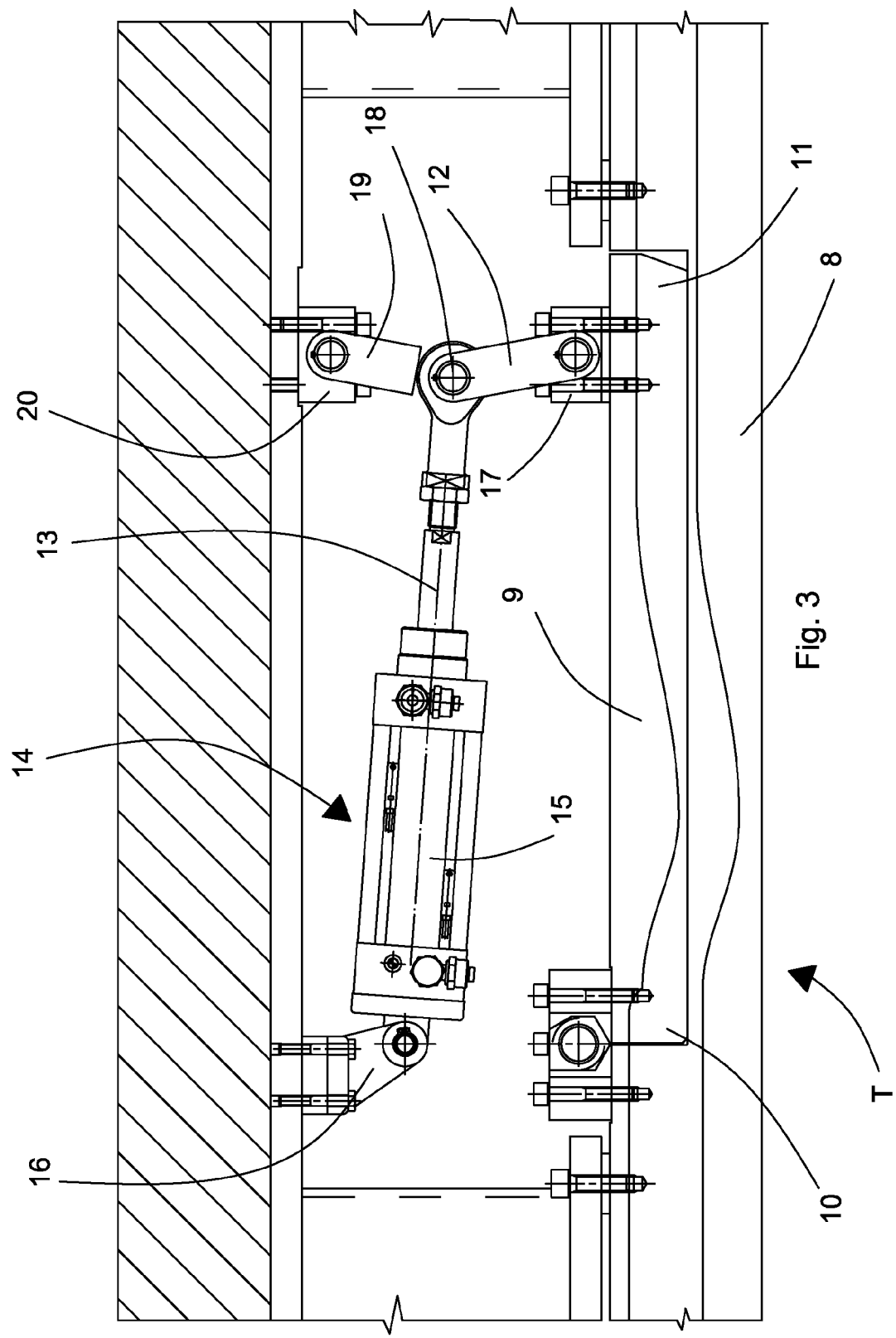
FIG. 3 illustrates the safety device according to the invention, in a non-operating position.

After cause has been eliminated that caused the failure of descent of the mould element 2 after moulding of the object 3, the cam track portion 9 is returned to an operating position, again driving the operating cylinder 14, until the cam track portion 9 is returned to the position illustrated in FIG. 3, in which it is again able to interact with the revolving element 7, so as to drive the extracting ring 5.

The invention claimed is:

1. A safety device for an apparatus for compression-moulding objects, said apparatus comprising a moulding carousel provided with a plurality of punches and with a plurality of corresponding mould elements, each mould element being movable between a first position in which it does not interact with the respective punch and a second position in which it interacts with the respective punch for moulding an object, each punch being associated with an extracting device suitable for extracting from the respective punch a moulded object, said extracting device being operable by means of a cam track obtained in a fixed frame of said moulding carousel, wherein said cam track comprises a cam track portion that is movable between an operating position in which it interacts with said extracting device and a non-operating position in which it does not interact with said extracting device and in that a sensor is provided suitable for detecting whether, after moulding of a moulded object, the corresponding mould element returns to said first position.

2. A safety device according to claim 1, wherein said extracting device comprises a revolving element that is suitable for coupling with said cam track.

3. A safety device according to claim 2, wherein said cam track comprises a circumferential groove obtained in said fixed frame of the moulding carousel.

4. A safety device according to claim 1, wherein a first edge of said cam track portion is hinged to the frame of said moulding carousel.

5. A safety device according to claim 4, wherein a second end of said cam track portion is connected, via a first connecting-rod element, to a stem of an operating cylinder.

6. A safety device according to claim 5, wherein said stem is connected, via a second connecting-rod element, to said fixed frame.

7. A safety device, according to any one of claims 4 to 6, wherein a body of said operating cylinder is hinged on said fixed frame.

8. A safety device, according to claim 1, wherein said extracting device comprises an extracting element suitable for interacting with a moulded object adhering to the punch.

9. A safety device according to claim 8, wherein said extracting element is fixed to an arm that can slide in a vertical direction.

10. A safety device, according to claim 9, wherein said arm is provided, at an upper end thereof, with a revolving element that is suitable for coupling with said cam track.

\* \* \* \* \*